Figure 1:
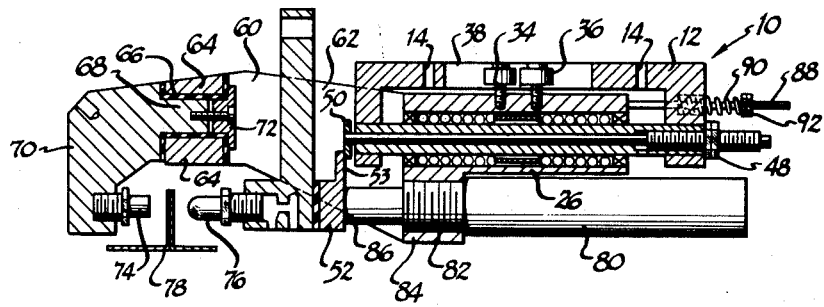

June 9, 1964

E. J. WALTONEN 3,136,879

SELF-EQUALIZING WELDING GUN

Filed May 17, 1961

3 Sheets-Sheet 1

INVENTOR.
EDWARD J. WALTONEN
BY
WILSON, SETTLE & CRAIG
ATTORNEYS

June 9, 1964 E. J. WALTONEN 3,136,879
SELF-EQUALIZING WELDING GUN
Filed May 17, 1961 3 Sheets-Sheet 2
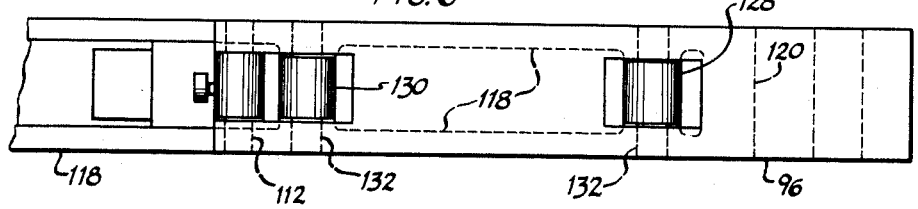
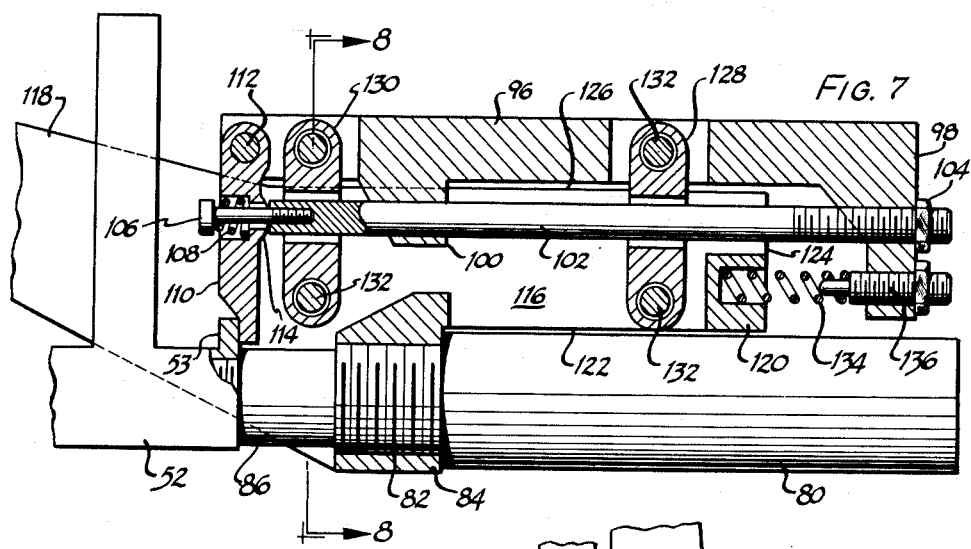
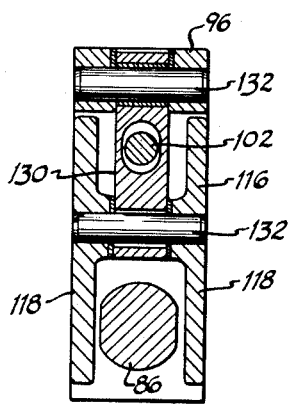
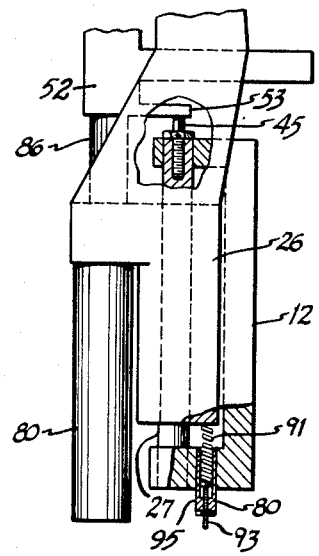
INVENTOR.
EDWARD J. WALTONEN
BY
WILSON, SETTLE & CRAIG
ATTORNEYS June 9, 1964 E. J. WALTONEN 3,136,879
SELF-EQUALIZING WELDING GUN
Filed May 17, 1961 3 Sheets-Sheet 3
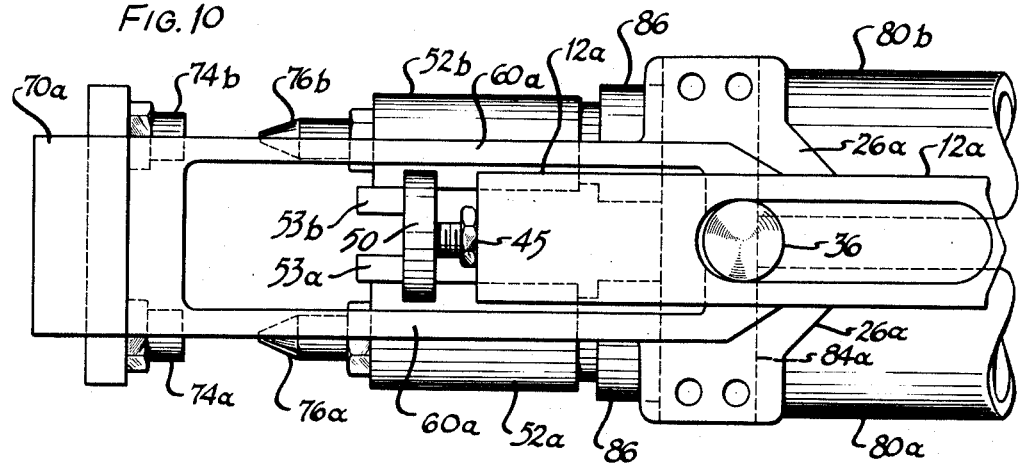
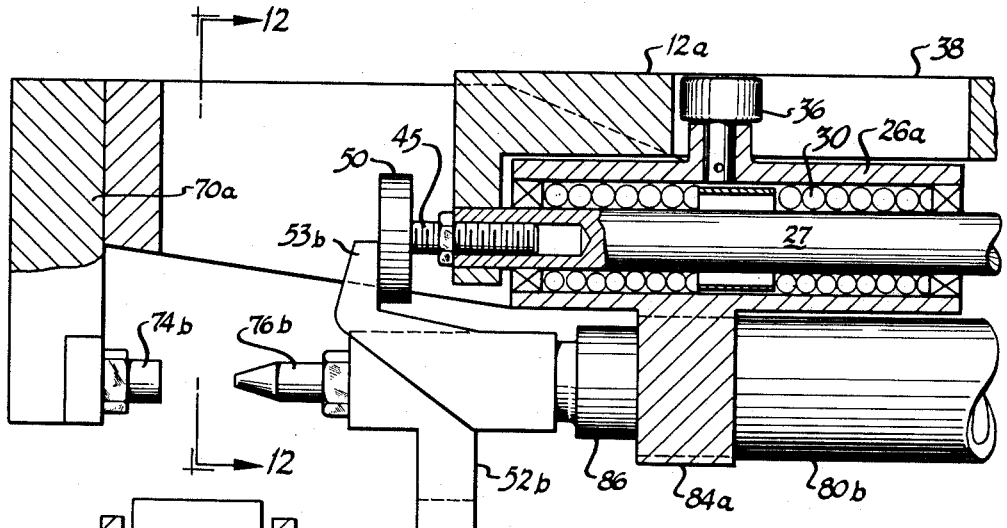
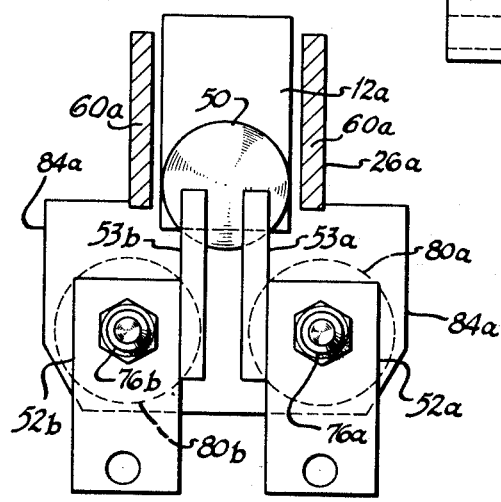
INVENTOR.
EDWARD J. WALTONEN
BY
WILSON, SETTLE & CRAIG
ATTORNEYS

United States Patent Office 3,136,879
Patented June 9, 1964

3,136,879
SELF-EQUALIZING WELDING GUN
Edward J. Waltonen, Southfield, Mich., assignor to Wes Industries, Inc., Royal Oak, Mich., a corporation of Michigan
Filed May 17, 1961, Ser. No. 110,797
19 Claims. (Cl. 219—89)

This invention relates to force-applying devices such as are employed in welding guns, riveters, and similar tools wherein two opposed work-contacting members are powered into engagement with opposite faces of a work piece structure. The invention will be described hereinafter with reference to its use in a welding gun, although it will be appreciated that the invention is of broader application.

One object of the invention is to provide a force-applying device wherein two opposed work-contacting members are arranged to move toward and away from one another so as to pressure against opposite faces of an interposed work structure, with the contact members being arranged so as not to deform or bend the work piece by uneven pressures on the two work piece faces.

A further object of the invention is to provide a force-applying device having two opposed work-contacting members arranged so that variation in the position of the work piece is ineffective to cause any deformation or bending of the piece due to distortion from the contact members.

An additional object of the invention is to provide a force-applying device including a floatable mounting carriage for supporting one work contact and a power means disposed on said carriage for supporting a second work contact, the arrangement being such that the power means can be actuated to initially impart motion to the carriage for bringing the first contact into position and can thereafter be powered to bring the second contact into position, the entire operation being characterized by an absence of distortion of the work.

A further object of the invention is to provide a force-applying device having an improved mechanism for floatably, anti-frictionally mounting a contact-carrying carriage structure.

A still further object of the invention is to provide a force-applying device having an improved anti-friction arrangement for floatably mounting a contact-carrying carriage and restricting same to substantially rectilinear motion.

An additional object of this invention is to provide a force-applying device having an improved arrangement of parts wherein an adjustable stop structure is incorporated within an anti-friction mounting means to limit the motion of a carriage at precise readily controlled locations.

A still further object of the invention is to provide a force-applying device having improved features of parts simplicity, low cost, compact design, wide range of utility, sturdy construction, and long service life.

Other objects of this invention will appear in the following description and appended claims, reference being had to the accompanying drawings forming a part of this specification wherein like reference characters designate corresponding parts in the several views.

Figure 2:
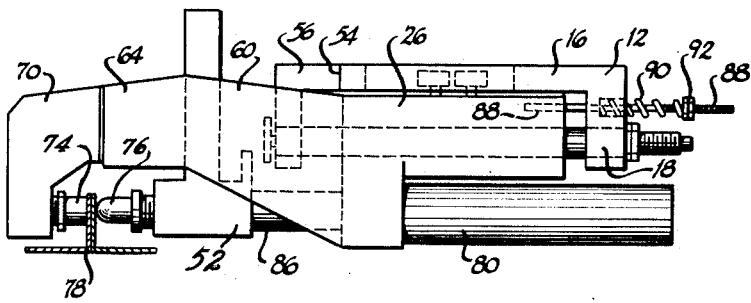
Figure 3:
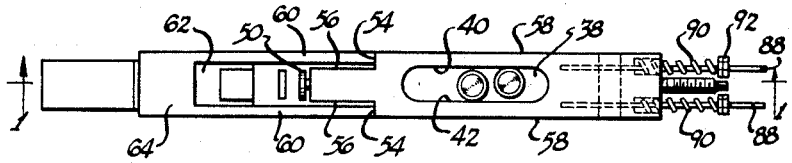
Figure 5:
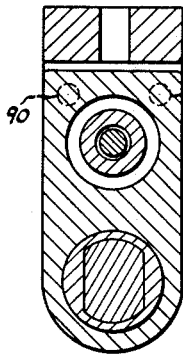
Figure 4:
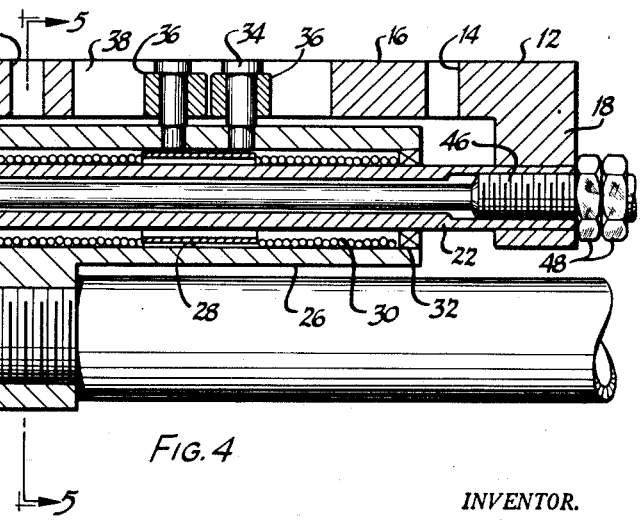

In the drawings:
FIG. 1 is a sectional view of one embodiment of the invention taken on line 1—1 in FIG. 3.
FIG. 2 is an elevational view of the FIG. 1 embodiment showing it in a second position of adjustment.
FIG. 3 is a top plan view of the FIG. 1 embodiment.
FIG. 4 is an enlarged section view of a portion of the FIG. 1 embodiment.
FIG. 5 is a sectional view taken on line 5—5 in FIG. 4.
FIG. 6 is a top plan view of the FIG. 7 structure.
FIG. 7 is a sectional view taken through a second embodiment of the invention.
FIG. 8 is a sectional view taken on line 8—8 in FIG. 7.
FIG. 9 is a fragmentary elevational view of a third embodiment of the invention.
FIG. 10 is a top plan view of the structure of FIG. 11.
FIG. 11 is a fragmentary sectional view taken through a fourth embodiment of the invention, and
FIG. 12 is a sectional view taken on line 12—12 in FIG. 11.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring in greater detail to FIG. 1 of the drawings, there is shown a force-applying device constructed as a welding unit 10. The unit incorporates a mounting frame 12 of generally U-shaped construction, suitable openings 14 being provided in the web portion 16 thereof to mount the unit in position on a suitable support structure (not shown). As best shown in FIG. 4, mounting frame 12 includes two generally parallel arm portions 18 and 20 which are provided with aligned bores to fixedly receive the hollow shaft 22. A suitable pin 24 is provided to lock the shaft in fixed position on the mounting frame so that the shaft serves as a fixed rigid non-deformable support structure for the carriage generally designated by numeral 26.

The carriage includes a body portion which is provided with a circular bore 28 and suitable anti-friction means such as ball bearings 30 are provided in the annular space between bore 28 and shaft 22 to anti-fractionally mount the carriage for back-and-forth movement along the length of shaft 22. Preferably the bearing construction is precharged with lubricant and sealed at its ends, as by the seals 32.

In the illustrated embodiment carriage 26 is required to move rectilinearly without rotation on shaft 22. Accordingly the carriage is provided with at least one upstanding pin 34, on which is positioned a roller 36. It will be seen that the roller operates within a longitudinal slot 38 in the mounting frame 12 so as to prevent the carriage 26 from rotating about the axis of shaft 22 during carriage movement. FIGS. 3 and 4 show the carriage as provided with two rollers 36 slightly offset from one another as shown in FIG. 3 so that one of the rollers engages slot surface 40 and the other roller engages slot surface 42. This arrangement works very well to prevent rotation of the carriage without tending to retard the carriage in its rectilinear motion. However a single roller has also proven effective for this purpose, and in its broader aspects the invention is not limited to the use of two rollers.

Referring particularly to FIG. 4, there is shown within shaft 22 an elongated rod 44 having an enlarged threaded section 46 engaged with suitable threads formed in the shaft, the arrangement being such as to enable the rod to be adjusted to different longitudinal positions within the hollow shaft and to be locked in different positions by suitable means such as nuts 48. The left end portion of the rod may have affixed thereto a disc 50 which functions as a stop for the welding head 52 shown in FIG. 1. If desired, disc 50 could be eliminated, in which case the projecting end portion of rod 44 would function as the stop.

Referring for the moment to FIGS. 2 and 3, it will be noted that the left end portion of frame 12 is of reduced lateral dimension, i.e. the frame is configured to define the shoulders 54 and the vertical side surfaces 56, said surfaces 56 being located inwardly of the general planes of the side surfaces 58 of the frame so as to provide free spaces for accommodation of the parallel arm portions 60 of carriage 26. Thus, arm portions 60 of the carriage extend on both sides of the head structure 52 without contacting same or in any manner interfering with relative movement thereof. Stated another way, the arm portions 60 of the carriage form a hollow space 62 for accommodating the head structure 52.

As shown best in FIG. 3, the carriage arm portions 60 are connected together at their left ends by an integrally formed connector portion 64. As shown in FIG. 1 the connector portion is provided with an opening 66 for receiving the plug portion 68 of a welding head 70. Suitable plug-screw means 72 is provided to secure welding head 70 in fixed position on connector portion 64. Conventional opposed welding electrodes or work contacts 74 and 76 are suitably carried in heads 70 and 52 so as to engage opposed faces of a work structure 78 as shown in FIG. 2.

In order to power the electrodes between their FIG. 1 and FIG. 2 positions there is provided a conventional double acting fluid cylinder 80 having a threaded mounting portion 82 extending within the lower portion 84 of the carriage 26. The fluid cylinder is provided with a conventional piston rod 86 which suitably connects with the head 52 so that at suitable times the introduction of pressure fluid into the right end of the cylinder is effective to power head 52 toward work structure 78.

Referring for the moment to FIG. 2, carriage 26 has secured in the upper portion thereof at least one rod 88 which freely extends through a suitable opening in arm portion 18 of fixed frame 12. Each of the openings is counterbored to receive the end portion of a compression spring 90. The other end of spring 90 engages against a seat formed by the nuts 92 which are threaded onto the threaded end portion of rod 88. It will be apparent that if desired a single spring may be employed in lieu of the springs 90 thereby making it possible to shorten up the assembly. It will be seen that by this spring-rod arrangement the spring means is enabled to exert a biasing force tending to draw carriage 26 to the right in FIGURE 1. The spring rate and spring force are so chosen, and the nuts 92 are so adjusted, that the biasing force is preferably just sufficient to overcome the inertia of carriage 26. The inertia forces are those existing because of the weight of the carriage and the elements supported thereon, the frictional drag between the carriage and shaft 22, and the frictional drag between rollers 36 and frame 12. Due to the design of the unit these inertial forces are relatively small, and in most cases spring 90 is a relatively light spring. In any event it will be realized that the basic objective is to make the carriage movable to the right from its FIG. 1 position with as little power requirement as possible. Thus, spring 90 is chosen and adjusted so that the carriage is biased very slightly to the right such that in the absence of other force conditions the electrode 74 is engaged against the work piece 78 with very little contact force.

In use of the unit, after the work piece 78 has been located with a portion thereof between the electrodes as shown in FIG. 1, pressure fluid (such as air) is introduced into the right end portion of cylinder 80. This causes the piston rod 86 to move to the left relative to cylinder 80. However, the piston rod initially has no absolute movement because spring means 90 initially biases the carriage 26, cylinder 80, and head 70 to the right such that electrode 74 abuts against the left face of work pieces 78 with a relatively low contact pressure. As electrode 74 strikes the work piece the carriage is limited in its rightward motion and further relative movement of piston rod 86 out of cylinder 80 is effective to advance head 52 and electrode 76 to the left until it strikes the right face of the work piece 78. The continued introduction of pressure fluid into the right end portion of cylinder 80 becomes effective to establish the necessary pressure of the electrodes 74 and 76 on the work piece for carrying out a welding operation. After the welding operation pressure fluid is fed into the left end of cylinder 80 to return the parts to the FIG. 1 positions. During the period of high squeezing pressure on the work the reaction force on stop 50 is carried through threads 46 so as to place shaft 22 in tension. This action is very desirable since it prevents any bow in the shaft such as would be caused if the shaft were in compression; a bowed shaft would tend to cause binding of the carriage in its movement or premature failure.

It will be noted that during movement of the electrodes toward the work structure there is at no time an excessively high pressure on the work pieces such as would deform same. Thus, when electrode 74 is alone contacting the work piece there is only the very small pressure obtained by the spring means 90, and when electrode 76 later strikes the work piece the work piece is backed up by the electrode 74. This backup force carries through the head 70, carriage arm portions 60, the carriage proper 26, and back to cylinder 80 so that there is no tendency of the work piece to be deformed by pressure of the electrodes. This is very important in the welding of very thin work piece structures since any bending or deformation of the work piece might cause permanent warpage and an unsatisfactory product. The ability of the electrodes to operate without deformation of the work piece may be broadly termed pressure equilization.

It will be appreciated that the pressure equalization feature is obtained irrespective of the exact position of the work piece 78 when it is initially located between the two eletcrodes. Usually, and by intent, the work pieces will be initially located with the left face thereof as close as possible to the electrode 74 so that there will be little or no movement of this electrode when pressure fluid is fed into the right end of cylinder 80. However, when a large work structure is simultaneously being welded at a very large number of points by a series or bank of the illustrated welding guns, it is difficult for each of the various electrodes 74 to be initially set in the same positions relative to the work piece. Thus, the work piece may vary as to its dimension at various points on its periphery, and the various welding guns may be offset slightly from one another in longitudinal directions, and the various electrodes 74 may at any time be worn away to different extents or degrees. As above noted, these various factors do not interfere with operation of the unit because the pressure equalization feature is obtained irrespective of the exact starting position of each electrode 74. Thus, whatever the exact starting position of electrode 74 relative to the work piece, the spring means 90 will, as soon as fluid is introduced into the right portion of cylinder 80, bias the carriage 26 to a position wherein electrode 74 is lightly engaged with the work piece.

As previously noted, the biasing action of spring 90 does not become effective on carriage 26 until pressure fluid is introduced into the right end portion of cylinder 80, the reason being that upstanding portion 53 of head 52 is engaged with stop 50 to prevent such biasing action from taking place. The location of stop 50 may, as previously noted, be changed by adjustment of rod 44, and it will be seen that by this adjusting operation the starting positions of the electrodes or the spacing thereof may be varied to suit conditions of the work. Thus, when the work pieces are relatively thin the rod 44 can be adjusted to the left to provide a relatively short electrode spacing and when the work pieces are relatively thick the rod 44 can be adjusted to the right to provide a large spacing of the electrodes.

Referring now to a second embodiment of the invention (FIGS. 6 through 8), there is shown a mounting frame 96 having two spaced arms 98 and 100 for mounting a rod 102, the right end of which is threaded to mesh with suitable threads formed in arm 98. A lock nut 104 may be provided to lock the rod in adjusted positions relative to frame 96. The left end portion of rod 102 carries a bolt 106 which defines a seat for one end of a compression spring 108. The other end of the spring is seated within a counterbore in arm 110, which is pivotally suspended from frame 96, as by the pin 112. The right surface of arm 110 is given a cylindrical curvature, as at 114, so that the arm continually engages the end surface of rod 102 without any binding action or movement differential. It will be seen that spring 108 continually urges arm 110 against rod 102, and (except for the periods when the rod is being adjusted) there is never any relative movement between arm 110 and rod 102. Thus, rod 102 backs up the arm 110 against the force of upstanding portion 53 of head 52, with the spring 108 serving merely to prevent any play of arm 110.

Head 52 is carried on the piston rod 86 of the fluid cylinder 80, said cylinder being mounted in the lower threaded portion 84 of a carriage 116, FIGURE 8. The carriage 116 is preferably formed as a one piece casting and is configured to provide two parallel arm portions 118 (shown best in FIG. 8). The aforementioned threaded portion 84 bridges these arm portions, and a second bridging portion is provided by the connector section 120 shown in FIG. 7. Also, the extreme left portions of the carriage arms 118 (not shown) are bridged by a connector section similar to connector section 64 shown in FIGS. 1 through 3. As seen in FIG. 7, the carriage arm portions 118 are provided with under edge surfaces 122, right edge usrface 124, and upper edge surface 126 so that the carriage is free to shift back and forth without striking any part of the frame 96. The carriage is mounted for back and forth movement by means of two links 128 and 130, suitable pivot pins 132 being provided to operatively connect the lower ends of the links to the carriage and the upper ends of the links to the mounting frame 96.

A compression spring 134 is positioned between the carriage section 120 and an adjustable seat formed by the screw 136, the arrangement being such that the spring exerts a biasing force tending to urge the carriage 116 to the left in FIG. 7. The carriage is provided with a head similar to head 70 and an electrode similar to electrode 74, and it might at first study therefor appear that spring 134 would be effective to bias the electrode 74 away from the work piece. However, this is not the case because the FIG. 7 arrangement is specifically intended for an installation wherein the weight of the carriage, cylinder 80, and head 52 has a downward component of motion, as for example in the case where the unit is tipped as with frame 96 extending vertically or at some position other than horizontal. Thus, if we assume the unit to be located in a vertical position, with head 52 above cylinder 80, the pressure of head portion 53 on stop arm 110 holds the carriage 116 in its illustrated position. As the pressure fluid is fed into the lower end of cylinder 80 portion 53 tends to move upwardly away from arm 110. However, the weight of cariage 116 and cylinder 80 overcomes spring 134 and causes the carriage to be lowered against the action of spring 134 without separation of portion 53 from arm 110, until after electrode 74 has abutted against the work piece. The continued upward actuation of piston rod 86 causes the head 52 to move upwardly from arm 110 until the electrode 76 (not shown) has abutted against the work piece in the manner previously described in connection with the FIG. 1 embodiment.

In the FIG. 7 arrangement the spring strength and rate, are so chosen and the screw 136 is so adjusted, that the effective weight of carriage 116 and cylinder 80 are slightly greater than the effective force of the spring so that the carriage will initially move down as desired. The desired objective is, as in the FIG. 1 embodiment, a substantially floating condition of the carriage weight so that the back-up electrode 74 has only a very small contact force against the work piece while the electrode 76 is being advanced toward the work piece. As noted, this arrangement eliminates distortion of thin work pieces and problems encountered by improper location of the work piece relative to the gun.

From the above discussion, it will be appreciated that the ability of the unit to maintain the carriage 116 in a substantially floating condition is in part dependent upon the disposition of the unit relative to an up-and-down gravitational axis. Thus, when the unit is positioned horizontally, a spring means such as spring 90 in FIG. 1, can be used to achieve the necessary biasing of the carriage. In such an installation the spring can be of relatively low strength because it needs only to overcome slight friction and inertia forces. When the unit is positioned vertically, with head 52 above cylinder 80, the weight of the carriage exerts a substantial downward force component so that the spring should act in an upward direction on the carriage as described in connection with the unit shown in FIG. 7. By this it is not meant to imply that only a compression spring can be used, since it will be appreciated that suitable modification of the unit could be resorted to to enable the use of a tension spring; in such case the spring would exert an upward pulling action on the carriage. When the unit is used in positions tipped between the vertical and horizontal orientations the effective weight of the carriage will be correspondingly varied, which will necessitate changes in spring force as will be apparent.

FIG. 9 illustrates a slight modification of the FIG. 1 construction. As shown in FIG. 9 the unit is tipped on its end so that carriage 26 travels vertically. In this installation the upward biasing action of compression spring 91 is chosen to be less than the carriage weight so that the carriage moves down when pressure fluid is initially pumped into the lower end of cylinder 80. The effective force of the spring is adjustable by disposing it against a vertically adjustable screw 93 threaded into a hollow sleeve 95 secured in frame portion 12.

FIG. 9 illustrates the stop for portion 53 as being formed by a short screw 45 threaded into the end of shaft 27. In most instances the FIG. 1 through-rod arrangement is more suitable because of easier adjustment accessibility, but in some cases the FIG. 9 adjustment arrangement is advantageous. In some instances the stop 53 can be adjustably mounted on head 52 in lieu of or in addition to adjustably mounting stops 45 or 50.

FIG. 10 shows the invention as applied to a double gun unit, i.e. a unit having two sets of electrodes. The carriage 26a and mounting frame 12a are essentially the same as in the FIG. 1 unit except that the carriage arms 60a are spaced further apart.

As shown, head 70a carries two electrodes 74a and 74b, while heads 52a and 52b carry work contacting electrodes 76a and 76b. Each of these last mentioned heads carries a stop portion 53a or 53b for cooperating action against a stop disc 50 carried on adjusting rod 45.

It will be seen that each of heads 52a and 52b is connected with a piston rod 86, which operates from a fluid cylinder 80a or 80b, these cylinders being mounted on the lower portion 84 of carriage 26a. An anti-friction means 30 mounts the carriage for back-and-forth movement on fixed rod 27, and a spring means (not shown) is provided so that the carriage is biased to the right when pressure fluid is pumped into the right ends of cylinders 80a and 80b. The general mode of operation of the devices is as discussed above in connection with the previously described embodiments.

The arrangement of FIGS. 10 through 12 is of advantage in that the sets of electrodes can be spaced closer together than is the case when two of the FIG. 1 units are employed. Also, the FIG. 10 requires only one carriage and pressure equalization arrangement per two sets of electrodes, thereby reducing the cost of the mechanism. Each embodiment of the invention incorporates the pressure equalization feature.

The features of the invention are set forth in the accompanying claims.

I claim:

1. In a pressure equalizing work gripping device, a frame, a support arm pivotally mounted at one end to said frame, a carriage pivotally mounted to the other end of said arm and adapted for lineal movement, a first work gripping member fixedly mounted to said carriage, a second work gripping member movably mounted on said carriage in opposing relation to said first work gripping member, means for moving said second work gripping member, stop means on said second work gripping member engageable with said frame, and means biasing said carriage in a direction carrying said first work gripping member toward said second work gripping member.

2. In a pressure equalizing work gripping device, a frame, a support arm pivotally mounted at one end to said frame, a carriage pivotally mounted to the other end of said support arm and adapted for lineal movement, a first work gripping member fixedly mounted to said carriage, a fluid cylinder mounted on said carriage, a second work gripping member carried by said fluid cylinder in opposing relation to said first work gripping member and movable relative to said first work gripping member, stop means on said second work gripping member engageable with said frame, and means biasing said carriage in a direction moving said first work gripping member toward said second work gripping member.

3. In a pressure equalizing work gripping device, a bar, a carriage supported by said bar and freely movable therealong, a first work gripping member fixedly mounted to said carriage, a fluid cylinder mounted on said carriage, a second work gripping member carried by said fluid cylinder in opposing relation to said first work gripping member and movable relative to said first work gripping member, stop means on said second work gripping member engageable with said frame, and means biasing said carriage in a direction moving said first work gripping member toward said second work gripping member.

4. In a pressure equalizing work gripping device, a frame, a mounting bar carried by said frame, a carriage floatably surrounding said mounting bar, anti-friction means on said carriage and engageable with said frame to prevent rotation of said carriage relative to said mounting bar, a floatably mounted work-contact supported by said carriage, a powered work-contact on said carriage, and power means operable to initially drive said floatably mounted contact against one face of a work piece with a relatively low engagement force and to thereafter drive said power contact against an opposite face of the work piece and to then act against both said contacts for causing them to exert substantial pressure on the work piece and comprising the combination of a first fixed stop element; a second moveable stop element rigid with the powered contact; and means exerting a biasing action on the floatably mounted contact such that it tends to move toward the work structure in the absence of energization of the power means; said stop elements being initially arranged to engage one another to prevent such movement of the floatably mounted contact so that energization of the power means tends to shift the second stop element away from the first stop element for permitting the desired movement of the floatably mounted contact.

5. The combination of claim 4 wherein at least one of the stop elements is adjustably mounted so as to adjust the initial position and stroke of the floatably mounted contact.

6. A force-applying device comprising a fixed frame having a guide slot and two spaced wall portions; a cylindrical shaft extending between and secured to said wall portions; a carriage of lesser length than the space between the wall portions and surrounding the shaft in spaced relation thereto; moveable anti-friction means between the shaft and carriage for enabling the carriage to float back and forth on the shaft; at least one roller mounted on a portion of the carriage and operating within the aforementioned guide slot to restrict the carriage to rectilinear motion while permitting it to have a desired frictionless floating action on the shaft; said carriage including a body portion surrounding the aforementioned shaft, two spaced parallel arms extending therefrom in a generally longitudinal direction, and a wall structure connecting said spaced arms at points remote from the carriage body portion; a first head secured to said wall structure; a second head positioned within the space defined by the spaced arms but free of connection therewith; first and second work contacts carried by respective ones of the heads for engaging an interposed work structure when the heads are moved toward one another; fluid cylinder means operatively positioned between the second head and a portion of the carriage; and cooperating stop elements, one mounted for movement with the second head, and the other mounted to stay with the aforementioned frame; the arrangement being such that with the stop elements engaged with one another the fluid cylinder means may be energized to (1) initially allow the carriage to move to a position wherein the first contact engages the work structure, and to (2) thereafter move the second head to a position wherein the second contact engages the work structure and to (3) then exert oppositely acting forces on the carriage and second head which causes the contacts to exert a substantial squeezing pressure on the work structure.

7. In a force-applying device the combination comprising a mounting frame; an adjustable stop means normally locked in a fixed position relative to the frame but adjustable in a longitudinal direction to assume different positions; a carriage; means mounting the carriage for back-and-forth movement in a longitudinal direction; said carriage comprising an elongated body portion located adjacent the frame, two generally parallel arm portions extending longitudinally from the body portion, and a wall structure connecting the ends of the arm portions remote from the body portion; a first work contact carried by the connecting wall structure; at least one head structure disposed adjacent the arm portions; a second work contact extending from the head structure toward the first work contact so that each contact may engage one face of a work structure; at least one fluid cylinder secured to the body portion of the frame; a piston rod extending from the fluid cylinder to the head structure to move same; a second stop means carried by the head structure for normally engaging the first stop means; and spring means between the frame and carriage arranged so that introduction of pressure fluid into the cylinder is effective to cause the carriage to draw the first contact against the work, and to then move the second contact against the work, and to then apply a substantial squeezing of the contacts on the work.

8. The combination of claim 7 wherein there are two head structures, and a cylinder-piston rod combination for each head structure.

9. The combination of claim 7 wherein there is but one head structure and cylinder-piston rod combination.

10. The combination of claim 7 wherein the carriage mounting means comprises a fixed shaft extending through the body portion of the carriage and movable anti-friction means between the shaft and carriage.

11. The combination of claim 7 wherein the carriage mounting means comprises a set of links pivotally connected with the frame and carriage body portion to cause the carriage to move with a pendulum motion.

12. The combination of claim 7 wherein the spring means exerts a force on the carriage tending to move the first contact away from the second contact.

13. The combination of claim 7 wherein the spring means exerts a force on the carriage tending to move the first contact toward the second contact.

14. The combination of claim 7 wherein the spring means exerts a force on the carriage tending to maintain the stop means in engagement with one another.

15. The combination of claim 7 wherein the spring means exerts a force on the carriage tending to separate the stop means from one another.

16. The combination of claim 7 wherein the adjustable stop means comprises an elongated rod having a threaded portion for adjusting its position; said rod being generally parallel to and coextensive in length with the frame, and having an end thereof accessible from the end of the frame remote from the contacts.

17. The combination of claim 16 wherein the rod end remote from the threaded end constitutes the stop means portion engageable with the second stop means.

18. The combination of claim 16 wherein the first stop means includes a lever having one end thereof pivotally connected with the frame and having the other end located in the path of travel of the second stop means; said lever having its central portion engaged with the rod to be movable therewith during its adjusting movements.

19. In a force applying device, the combination comprising two opposed work contacts arranged to engage opposite faces of a work structure; a floatably mounted carriage connected with one of the contacts for moving same toward and away from the work structure; counterbalance means acting on said carriage so that in the absence of other forces said one contact engages the work structure with a relatively low engagement force; reciprocable power means connected between said carriage and the other contact; and a relatively stationary stop structure located to limit movement of said other contact away from the work structure so that (1) when the power means is energized the other contact remains in place while the carriage is powered away from the work structure and the one contact is drawn against the work structure, and (2) when the power means is continued to be energized the work structure acts as an abutment to limit carriage movement and thereby cause the stroke of the power means to be applied to the other contact for moving same toward the work structure.

References Cited in the file of this patent
UNITED STATES PATENTS

| | | |
|---|---|---|
| 2,372,413 | Weightman | Mar. 27, 1945 |
| 2,879,373 | Fagge | Mar. 24, 1959 |
| 2,952,765 | Droste | Sept. 13, 1960 |
| 3,008,032 | Wolfbauer | Nov. 7, 1961 |
| 3,008,034 | Wolfbauer | Nov. 7, 1961 |